(12) United States Patent
Kennedy (10) Patent No.: US 10,024,184 B2
(45) Date of Patent: Jul. 17, 2018

(54) ACTUATION PIVOT SHAFT FACE SEAL

(71) Applicant: BorgWarner Inc., Auburn Hills, MI (US)

(72) Inventor: Donald M. Kennedy, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 111 days.

(21) Appl. No.: 15/136,359

(22) Filed: Apr. 22, 2016

(65) Prior Publication Data

US 2016/0237838 A1 Aug. 18, 2016

Related U.S. Application Data

(63) Continuation-in-part of application No. PCT/US2014/061444, filed on Oct. 21, 2014.

(Continued)

(51) Int. Cl.
*F02D 23/00* (2006.01)
*F01D 11/00* (2006.01)
(Continued)

(52) U.S. Cl.
CPC ............ *F01D 11/003* (2013.01); *F01D 11/00* (2013.01); *F01D 11/006* (2013.01); *F02B 37/24* (2013.01);
(Continued)

(58) Field of Classification Search
CPC ...... F01D 11/003; F01D 11/00; F01D 11/006; F02B 37/24; F02B 39/00; F02C 6/12;
(Continued)

(56) References Cited

U.S. PATENT DOCUMENTS 2,592,728 A * 4/1952 Payne ...................... F16J 15/38
277/373
2,976,013 A * 3/1961 Hunter .................... F01D 9/045
415/110

(Continued)

FOREIGN PATENT DOCUMENTS

FR 2343953 A * 11/1977
JP 2000193044 A * 7/2000

(Continued)

OTHER PUBLICATIONS

USH2289, Kennedy, Actuator Pivot Shaft Rolling Bearing with Seal, United States Statutory Invention Registration, Published Feb. 4, 2014, United States Patent and Trademark Office.

(Continued)

*Primary Examiner* — Thai Ba Trieu
(74) *Attorney, Agent, or Firm* — Young Basile Hanlon & MacFarlane, P.C.

(57) ABSTRACT

A Variable Turbine Geometry (VTG) turbine turbocharger comprises a turbine wheel in a housing, and a compressor wheel coupled to the turbine wheel with a main shaft. The turbocharger additionally includes a VTG assembly in the housing, an actuator outside the housing, and an actuation pivot shaft that extends through an opening of the housing and connects the VTG assembly to the actuator. A face seal assembly seals the opening, and includes an inner ring member rotationally fixed on the pivot shaft, a disc member, and a spring seal. The disc member includes a first face that forms a seal with a surface of the housing, and is rotationally fixed to, while being movable axially relative to, the inner ring member. The spring seal seals the inner ring member and the disc member, and applies a seating force against the disc member.

20 Claims, 9 Drawing Sheets

Related U.S. Application Data (60) Provisional application No. 61/894,640, filed on Oct. 23, 2013.

(51) Int. Cl.
*F16J 15/34* (2006.01)
*F16J 15/36* (2006.01)
*F02B 39/00* (2006.01)
*F02C 6/12* (2006.01)
*F02C 7/28* (2006.01)
*F02B 37/24* (2006.01)

(52) U.S. Cl.
CPC ............... *F02B 39/00* (2013.01); *F02C 6/12* (2013.01); *F02C 7/28* (2013.01); *F16J 15/3452* (2013.01); *F16J 15/3464* (2013.01); *F05D 2220/40* (2013.01); *F05D 2240/55* (2013.01); *Y02T 10/144* (2013.01)

(58) Field of Classification Search
CPC ...... F02C 7/28; F16J 15/3452; F16J 15/3464; F05D 2220/40; F05D 2240/55; Y02T 10/144
USPC ..... 60/602; 415/109, 110, 111, 170.1, 174.3, 415/229–230; 277/366–367, 392, 907
See application file for complete search history.

(56) References Cited

U.S. PATENT DOCUMENTS

| | | | |
|---|---|---|---|
| 3,026,114 A | 3/1962 | Andresen et al. | |
| 3,577,833 A * | 5/1971 | Skelton | F16J 10/02 277/530 |
| 3,672,689 A * | 6/1972 | Hadley | F16J 15/38 277/373 |
| 4,136,887 A * | 1/1979 | Wentworth, Jr. | F16J 15/3468 277/374 |
| 4,211,424 A | 7/1980 | Stein | |
| 4,253,713 A * | 3/1981 | Chambers, Sr. | F16J 15/344 384/132 |
| 4,295,654 A * | 10/1981 | Kawamura | F16J 15/344 277/380 |
| 4,968,044 A * | 11/1990 | Petrak | F16J 15/3456 277/392 |
| 5,014,999 A | 5/1991 | Makhobey | |
| 5,040,804 A * | 8/1991 | Back | F16J 15/008 277/558 |
| 5,158,305 A * | 10/1992 | Halling | F16J 15/3456 277/591 |
| 5,172,918 A * | 12/1992 | Pecht | F01D 11/003 277/400 |
| 5,207,559 A * | 5/1993 | Clevenger | F01D 17/165 415/166 |
| 5,560,622 A * | 10/1996 | Sedy | F16J 15/3452 277/390 |
| 5,799,953 A * | 9/1998 | Henderson | F16J 15/3212 277/554 |
| 6,116,610 A * | 9/2000 | Goldswain | F16J 15/166 277/395 |
| 6,364,605 B1 * | 4/2002 | Lutes | F04D 5/002 415/111 |
| 6,568,686 B2 * | 5/2003 | Hadley | F16J 15/348 277/370 |
| 6,568,687 B2 * | 5/2003 | Radosav | F16J 15/3452 277/369 |
| 6,866,271 B2 * | 3/2005 | MacDonald | F16J 15/3224 277/353 |
| 7,080,510 B2 | 7/2006 | Ishihara et al. | |
| 7,419,164 B2 | 9/2008 | Awtar et al. | |
| 7,461,846 B2 * | 12/2008 | Chitren | F16J 15/4478 277/347 |
| 7,604,239 B2 * | 10/2009 | Chitren | F16J 15/4474 277/301 |
| 7,644,583 B2 * | 1/2010 | Leavesley | F02B 37/24 60/602 |
| 7,857,320 B1 | 12/2010 | Chang | |
| 8,523,187 B2 * | 9/2013 | Eriksson | F16J 15/3464 277/370 |
| 8,651,804 B2 | 2/2014 | Hall et al. | |
| 9,080,504 B2 * | 7/2015 | Doehler | F02B 37/183 |
| 9,175,578 B2 * | 11/2015 | Igarashi | F01D 17/105 |
| 9,276,695 B2 * | 3/2016 | Boduch | H04J 14/021 |
| 9,383,018 B2 * | 7/2016 | Ryther | F16J 15/3224 |
| 2002/0070505 A1 * | 6/2002 | Auber | F16J 15/3464 277/358 |
| 2005/0079049 A1 | 4/2005 | Ishihara et al. | |
| 2010/0242927 A1 * | 9/2010 | Recktenwald | F16J 15/3228 277/549 |
| 2012/0318633 A1 | 12/2012 | Gattrugeri et al. | |
| 2012/0319020 A1 * | 12/2012 | Doehler | F02B 37/183 251/214 |
| 2012/0328416 A1 * | 12/2012 | Igarashi | F02B 37/24 415/159 |
| 2013/0228977 A1 * | 9/2013 | Thomas, Jr. | F16J 15/4478 277/413 |
| 2013/0287552 A1 | 10/2013 | House et al. | |
| 2014/0241858 A1 * | 8/2014 | Tashiro | F01D 11/005 415/111 |
| 2014/0248135 A1 * | 9/2014 | Inoue | F01D 17/14 415/150 |
| 2015/0061229 A1 * | 3/2015 | Ryther | F16J 15/3224 277/375 |
| 2015/0125275 A1 * | 5/2015 | Ueda | F02B 37/24 415/158 |
| 2016/0018002 A1 * | 1/2016 | Lenhert | F16J 15/181 277/540 |
| 2017/0058764 A1 * | 3/2017 | Bayod | F02B 37/24 |

FOREIGN PATENT DOCUMENTS

| | | |
|---|---|---|
| JP | 2009257090 A | 11/2009 |
| WO | 2012094153 A2 | 7/2012 |
| WO | 2015061241 A1 | 4/2015 |

OTHER PUBLICATIONS

"International Search Report and Written Opinion of the International Searching Authority" for International Application No. PCT/US2014/061444 dated Feb. 3, 2015, 12 pages.

* cited by examiner

ACTUATION PIVOT SHAFT FACE SEAL

CROSS-REFERENCE TO RELATED APPLICATION(S)

This application is a continuation-in-part of International Patent Application No. PCT/US2014/061444, filed Oct. 21, 2014, which claims priority to and all benefits of U.S. Provisional Application No. 61/894,640, filed on Oct. 23, 2013, and entitled "Actuation Pivot Shaft Face Seal With U Seal," the entire disclosures of which are incorporated herein by reference.

BACKGROUND

Field of the Disclosure

This disclosure relates to sealing components in conjunction with an actuation pivot shaft for turbochargers with Variable Turbine Geometry (VTG). More particularly, this disclosure relates to forming a seal with a seal ring between a disc and an inner ring being fit onto the actuation pivot shaft.

Description of Related Art

Advantages of turbocharging include increased power output, lower fuel consumption, and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor wheel that is mounted on the same shaft so that rotation of the turbine wheel causes rotation of the compressor wheel.

Turbochargers typically include a turbine housing connected to the engine's exhaust manifold, a compressor housing connected to the engine's intake manifold, and a center bearing housing coupling the turbine and compressor housings together. The turbine housing defines a volute that surrounds the turbine wheel and that receives exhaust gas from the engine. The turbine wheel in the turbine housing is rotatably driven by a controlled inflow of exhaust gas supplied from the exhaust manifold via the volute.

SUMMARY

VTG turbochargers allow a turbine flow cross-section leading to the turbine wheel to be varied in accordance with engine operating points. This allows the entire exhaust gas energy to be utilized and the turbine flow cross-section to be set optimally for each operating point. As a result, the efficiency of the turbocharger and hence that of the engine can be higher than that achieved with bypass control of a wastegate valve assembly. Variable guide vanes in the turbine have an effect on pressure build-up behavior and, therefore, on the turbocharger power output. This disclosure focuses on a Variable Turbine Geometry (VTG) aspect in the turbine stage of turbochargers, with an example shown in U.S. Pat. No. 7,886,536, which is incorporated herein by reference.

VTG turbochargers can utilize adjustable guide vanes that are pivotally connected to a lower ring and an upper vane ring, including various possible rings, and/or nozzle wall. These guide vanes are adjusted to control exhaust gas backpressure and turbocharger speed by modulating the exhaust gas flow to the turbine wheel. The guide vanes can be pivoted by vane levers, which can be located above the upper vane ring. Performance and flow to the turbine are influenced by changes of the flow angle to the turbine wheel by pivoting the guide vanes.

One goal of VTG turbochargers is to expand the usable flow rate range in practical applications while maintaining a high level of efficiency. To accomplish this, the turbine output is regulated by changing an inflow angle and inflow speed of the exhaust gas flow at a turbine wheel inlet. With VTG turbochargers, this is achieved using guide vanes in front of the turbine wheel that change their angle of attack with exhaust gas flow speed. This reduces lag at slow speeds while opening to prevent exhaust gas backpressure at higher speeds.

With VTG, turbocharger ratios can be altered as conditions change. When the guide vanes are in a closed position, the high circumferential components of the flow speed and a steep enthalpy gradient lead to a high turbine output and therefore to a high charging pressure. When the guide vanes are in a fully open position, the turbine reaches its maximum flow rate and the velocity vector of the flow has a large centripetal component. An advantage of this type of output control over bypass control is that the entire exhaust gas flow is always directed through the turbine and can be converted to output. Adjustments of the guide vanes can be controlled by various pneumatic or electrical regulators.

A VTG turbocharger may have an actuation pivot shaft with a VTG lever to help control the movement of the guide vanes. A VTG actuation pivot shaft is typically not fitted directly to a bore in the bearing housing, but more often to a stationary bearing in a bore in the bearing housing. The actuation pivot shaft is often radially located in a bearing, which can be located either in a bore, with a centerline within the turbine housing, or directly in the bearing housing depending on the design. The actuation pivot shaft system typically needs sealing between turbine gas pressure and atmospheric pressure.

The VTG actuation pivot shaft system is difficult to seal in part because of the clearance between the shaft and bushings. This clearance is necessary with the bushing design to prevent binding, but may create or allow for misalignment of the shaft relative to the bushing/housing (e.g., tilting of the shaft resulting in axial angular misalignment), and/or axial displacement of the shaft relative to the bushing/housing.

In some aspects, a face seal assembly is provided that is configured to provide a seal between an opening formed in a housing surface, such as an axial end face of a bushing, and a rotating shaft, such as an actuation pivot shaft for a VTG mechanism, that extends through the opening. The face seal assembly includes a seal ring, such as metal spring seal ring (e.g., a metal U-seal, or seal ring having another cross-sectional shape), in combination with and between an inner ring and a disc that are rotationally fixed to the actuation pivot shaft. In association with the disc, an inner ring is press fit onto the actuation pivot shaft to form a seal on the actuation pivot shaft. The inner ring may be an L-shaped sleeve or a substantially C-shaped ring in the cross section, designed to be press fit onto the actuation pivot shaft.

The disc is seated against one face of the bushing and is "keyed" to the inner ring to be rotationally fixed. Because the disc, inner ring, and the seal ring rotate together, the wear between the seal ring and those components is greatly reduced, as compared to if the seal ring were to instead directly engage and slide against the bushing or another member as the shaft is rotated. As a result, the primary wear interface is between the bushing and disc, since the disc bears against the bushing while the shaft is rotated. For this reason, the disc is made robust, for example by forming it of a material that accommodates high temperatures and wear. In addition, the disc has a flat, smooth face to form the face seal on the bushing.

Between the inner faces of the disc and the inner ring is a resilient seal ring (including styles, such as Z, U, C, E, M, W, or other cross-sectional shape) which applies a seating force against the disc. In some embodiments, turbine pressure acts to energize the seal ring and also applies the seating force against the disc. Advantageously, the seal ring serves as a sealing element between inner surfaces of the inner ring and disc, and also adds compliance to the system to permit misalignment (e.g., relative axial angular misalignment or tilt) and relative axial displacement while maintaining the face seal. This can be compared to some conventional, rigid face seals which are frequently ineffective for sealing the actuation pivot shaft since the conventional face seal become unseated as the shaft tilts (i.e., to cause axial angular misalignment) or moves axially relative to the bushing. Conventional metal seals that may be used in this application are thin, metallic rings of various cross sections (Z, C, U, E, etc.), which include a first surface that engages the disc and includes a second opposed surface facing away from the first surface and that engages the inner ring member. Were the metal seal ring to instead directly engage the bushing and slide thereagainst while the shaft is rotated, the metal seal ring would likely wear quickly due to the rotational relative motion between the shaft, seal, and bushing.

The face seal assembly, depending on the location with respect to the bushing and the cross-sectional shape of the seal ring, can be energized either by an external pressure on the seal ring or an internal pressure on the seal ring. When on the turbine-facing side of the bushing, a U-seal ring may be energized by external pressure from turbine gas outside the actuation pivot shaft. The U-seal ring, if positioned on the turbine-facing side of the bushing, includes a concave channel that opens radially outward to a high pressure region (i.e., in the turbocharger housing), such that the high pressure from the external region (i.e., radially outward region) pressurizes the channel forcing opposed walls of the seal ring axially outward (i.e., to energize the seal ring).

Alternatively, when on the compressor-facing side of the bushing, e.g., adjacent to the VTG lever, the face seal is still provided at the bushing, albeit the opposite side. An alternative U-seal ring would be energized from the internal pressure direction with higher pressure around the actuation pivot shaft than atmospheric pressure. The U-seal ring, if positioned adjacent to the VTG lever, includes a concave channel that opens radially inward to a high pressure region, such that the high pressure from the internal region (i.e., radially inward region) pressurizes the channel forcing opposed walls of the seal ring axially outward (i.e., to energize the seal ring). Different shapes of the concave/convex seal rings and inner rings are also preferred for external and internal pressurized face seals.

According to an embodiment, a Variable Turbine Geometry (VTG) turbine turbocharger comprises a turbine wheel disposed in a turbine housing, and a compressor wheel disposed outside the housing and coupled to the turbine wheel with a main shaft. The turbocharger additionally includes a VTG assembly disposed in the housing, an actuator disposed outside the housing, and an actuation pivot shaft that extends through an opening of the housing and connects the VTG assembly to the actuator. A face seal assembly seals the opening, and includes an inner ring member rotationally fixed on the pivot shaft, a disc member, and a spring seal. The disc member includes a first face that forms a seal with a surface of the housing, and is rotationally fixed and movable axially relative to the inner ring member. The spring seal ring forms a seal between the inner ring member and the disc member, and applies a seating force against the disc member.

According to an embodiment, an actuation system for a variable turbine geometry turbocharger comprises an actuator, a pivot shaft, and a face seal assembly. The pivot shaft is coupled to the actuator to be rotated thereby back and forth within a limited range of rotational movement. The face seal assembly comprises a first annular member, a second annular member, and a spring seal member. The first annular member is rotationally fixed to the pivot shaft and forms a seal therewith. The second annular member is rotationally fixed to the first annular member and axially movable relative thereto, and is configured to form a face seal with another member of the turbocharger. The spring seal member is compressible axially between the first annular member and the second annular member to therebetween form a seal that is maintained as the pivot shaft is moved to cause axial misalignment and axial displacement between the first annular member and the second annular member.

According to an embodiment, a face seal assembly comprises a first annular member, a second annular member, and a spring seal. The first annular member includes a cylindrical body having a central bore configured to be press fit onto a pivot shaft to be fixed thereto and to form a first seal therewith. The first annular member additionally includes a flange extending radially outward from the cylindrical body and a first rotational locking feature. The second annular member includes a central aperture configured to receive the cylindrical body of the first annular member therein. The second annular member additionally includes a first planar side surface that is configured to form a face seal, a second planar side surface opposite the first planar side surface, and a second rotational locking feature configured to engage the first rotational locking feature to rotationally fix the first annular member to the second annular member while allowing the second annular member to tilt and displace axially relative to the first annular member. The spring seal member includes a first axially facing surface that engages the flange to form a second seal therewith and includes a second axially facing surface that engages the second planar side surface to form a third seal therewith and to apply a seating force against the second annular member.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Figure 1:
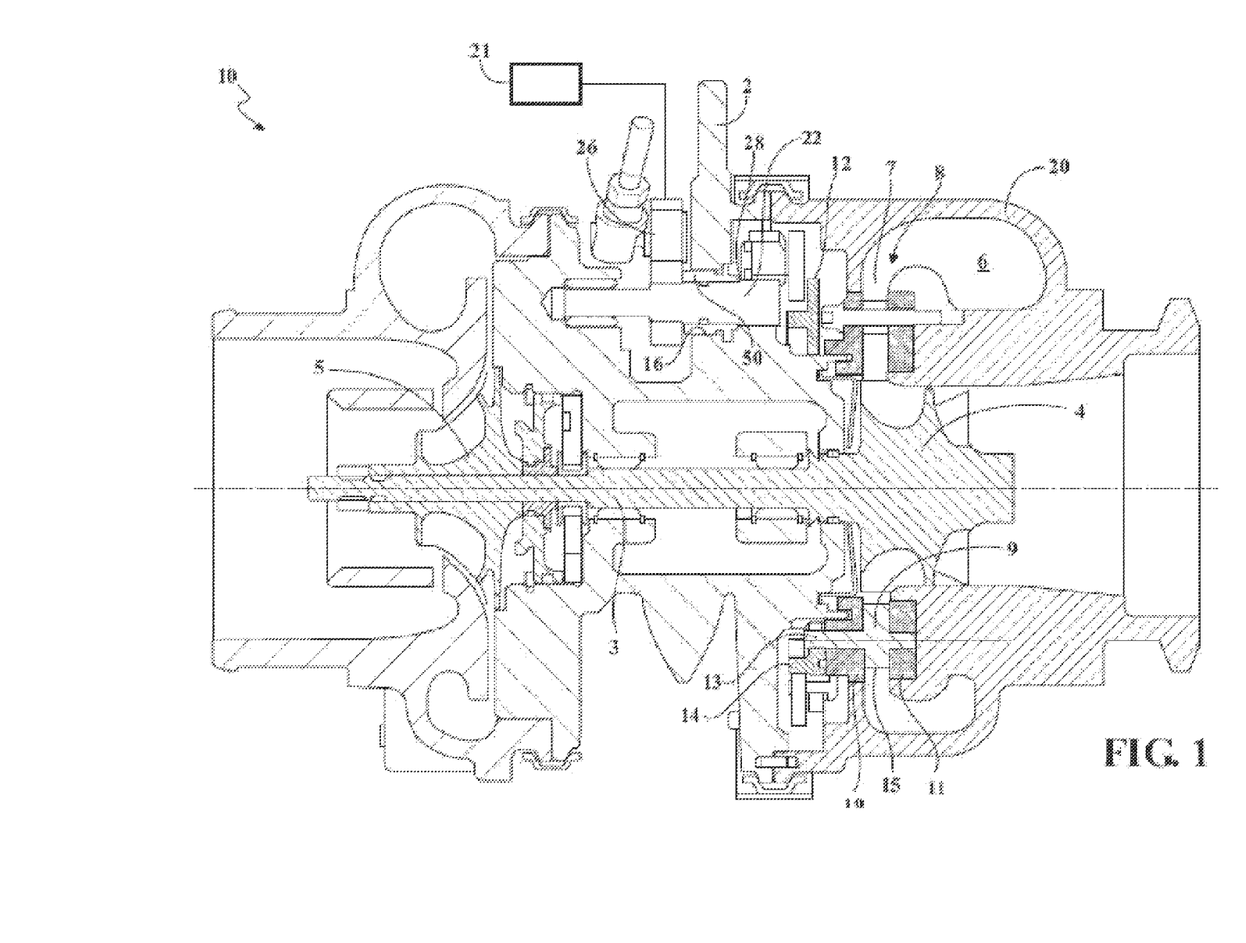
FIG. 1 is a cross sectional view of a VTG turbocharger including a face seal assembly with an external pressure U-seal disposed on an actuation pivot shaft.

Referring to FIG. 1, an exhaust-gas turbocharger 10 includes a housing consisting of a bearing housing 2 and turbine housing 20 with a pivoting main shaft 3 rotatably supported in the bearing housing 2. A compressor wheel 5 is carried on one end of the shaft 3, and a turbine wheel 4 is fixed to its other end and is disposed within a chamber defined by the housing (e.g., by one or more of the turbine housing 20 and bearing housing 2). The compressor wheel 5 is rotatably driven via the shaft 3 by the turbine wheel 4. Within the turbine housing 20, on the side of the turbine wheel 4, a volute 6 is formed which, in radial direction, evolves into a throat 7. A VTG assembly 8 including adjustable guide vanes 9 is located inside the throat 7.

The guide vanes 9 are pivotably supported between an upper vane ring 19 and lower vane ring 11, which are spaced apart by spacers 15. The guide vanes 9 are adjustable through an actuator 21 (depicted schematically) which actuates an adjustment ring 12. A rotary motion of the adjustment ring 12 with respect to the upper vane ring 19 is transmitted onto the guide vanes 9, which by this device can be adjusted within a pre-determined range between the open and closed positions. The spacing between the guide vanes 9 defines the flow channels of the circular throat 7 in which the exhaust gas radially flows toward the turbine wheel 4. The flow channels are adjustable through variation of the angular position of the guide vanes 9.

More specifically, the guide vanes 9 are mounted to the upper vane ring 19 by means of vane shafts 13, which penetrate the upper vane ring 19 and which carry a vane arm 14 on the end opposing the guide vanes 9. The adjustment ring 12 is located within the axial plane of the circular arranged vane arms 14. The adjustment ring 12 engages each of the vane arms 14 such that during rotation of the adjustment ring 12 with respect to the upper vane ring 19, all vane arms 14, and therewith the guide vanes 9, are simultaneously rotated. The adjustment ring 12 is connected to the actuator via the actuation pivot shaft 22, enabling the adjustment of the adjustment ring 12 from outside of the housing. To this end, the actuation pivot shaft 22 is rotatably supported within a bore 16 formed in the bearing housing 2 via a bushing 50 that is press fit into the bore 16. The actuation pivot shaft 22 is, for example, rotated back and forth by the actuator 21 within a limited range of motion (e.g., 45-60 degrees). The actuation pivot shaft 22 protrudes through openings in the bearing housing 2 so that one end 22a of the actuation pivot shaft 22 engages a VTG lever 26 on an outside of the bearing housing 2 (e.g., at a location that is at atmospheric pressure), and the opposed end 22b of the actuation pivot shaft 22 engages the VTG assembly 8 within the turbine housing 20 (e.g. at a location that is at a relatively higher pressure corresponding to the pressure of the exhaust gas). Due to the pressure gradient across the bearing housing 2, the actuation pivot shaft 22 and/or bushing 50 require sealing in order to prevent exhaust gas leakage from the bearing housing 2 via the bore 16.

Referring to FIGS. 2-8, the turbocharger 10 includes a face seal assembly 28 disposed between an opening 53 formed in an inside axial end face 54 of the bushing 50, and the actuation pivot shaft 22 that extends through the opening 53. The face seal assembly 28 is disposed on the inside axial end face 54 of the bushing 50 such that the face seal assembly 28 resides within the bearing housing 2 in region of relatively high pressure and temperature. The face seal assembly 28, as well as the other face seal assemblies 128, 228 and variants thereof, may be considered part of an actuation system that additionally includes the actuation pivot shaft 22, actuator 21, and/or the bushing 50, among other components or subsets thereof. It should be noted that the term seal (e.g., first, second, third, first portion, second portion, etc.) may refer to an individual seal formed between two components or members, or may refer to a cooperative seal formed between systems or components that includes multiple individual seals formed between different components thereof. For example, in some embodiments, one of the face seal assemblies 28, 128, 228 may form a seal between the bushing 50 (or housing) and the actuation pivot shaft 22, while interfaces between various components of the face seal assembly with each other, as well as with the bushing 50 and the pivot shaft 22, form individual seals that cooperatively form the seal between the bushing 50 and the pivot shaft 22.

The face seal assembly 28 includes a U-seal ring 60 that forms a seal between (e.g., seals) a disc 40 and an inner ring 30. That is, the seal ring 60 forms a first portion and a second portion of the seal between the disc 40 and the inner ring, or may alternatively be referred to as sealing with both (e.g., forming first and second seals with) the disc 40 and the inner ring 30. The inner ring 30 (e.g., first annular member) is annular and includes a hollow cylindrical base portion 32 configured to receive the actuation pivot shaft 22 in a press fit connection such that the inner ring 30 is rotationally fixed to the actuation pivot shaft 22 and forms a seal on the actuation pivot shaft 22. The inner ring 30 also includes a radially outward-extending arm 34 (e.g., radially extending flange) formed at a first end of the base portion 32, whereby the inner ring 30 has an L-shaped cross section. The inner ring 30 is disposed on the actuation pivot shaft 22 with a second or free end of the base portion 32 disposed at the opening 53, and the arm 34 axially spaced from the axial end face 54 of the bushing 50. The base portion 32 includes axially-extending slots 36 that open to the free end of the base portion 32.

The disc 40 (e.g., second annular member) has a shape that resembles a washer and includes an outer peripheral edge 44, an inner peripheral edge 43 that defines a central opening 45, and opposed planar side faces 41, 42 that extend between the outer peripheral edge 44 and the inner peripheral edge 43. One of the side faces, i.e., the first side face 41, is arranged to form a seal with the axial end face 54 of the bushing 50, whereby the other of the planar side faces, i.e., the second side face 42 faces the arm 34 of the inner ring 30. For example, the disc 40 is seated against the axial end face 54 of the bushing 50 and the disc 40 has the durable, flat, smooth first side face 41 to form a face seal on the bushing 50. The disc 40 includes equally-spaced radially-inwardly protruding rectangular tabs 46 formed on the inner peripheral edge 43. The base portion 32 of the inner ring 30 is received within the central opening 45, and the tabs 46 are configured to be received in the slots 36 of the base portion 32 of the inner ring 30, whereby the disc 40 is prevented from rotating relative to the inner ring 30 (e.g., the disc 40 is "keyed" to the inner ring 30). As a result, the disc 40 rotates with the inner ring 30, but is able to move axially within the slots 36. The disc 40 may have four equidistantly spaced tabs 46, such as shown on FIGS. 4-5, but is not limited to this configuration. Alternatively, the disc 40 may be fixed rotationally to the inner ring 30 in other manners, while still allowing relative axial displacement therebetween, for example, by having an opposite male/female relationship (e.g., tabs of the inner ring 30 being received within slots of the disc 40), having an axially sliding splined engagement (e.g., the inner ring 30 and the disc 40 having splines or teeth that interfit or mesh between each other), or other complementary rotational locking or meshing features, etc.

The disc 40 is formed of a material that can accommodate the high temperatures associated with engine exhaust gases (on the order of 700 degrees Celsius), and is highly wear resistant to prevent wear due to relative rotational movement between the first side face 41 and the bushing 50. Such materials include, but are not limited to, metals such as Inconel or Ferrochrome alloys and ceramic materials.

Figure 2:
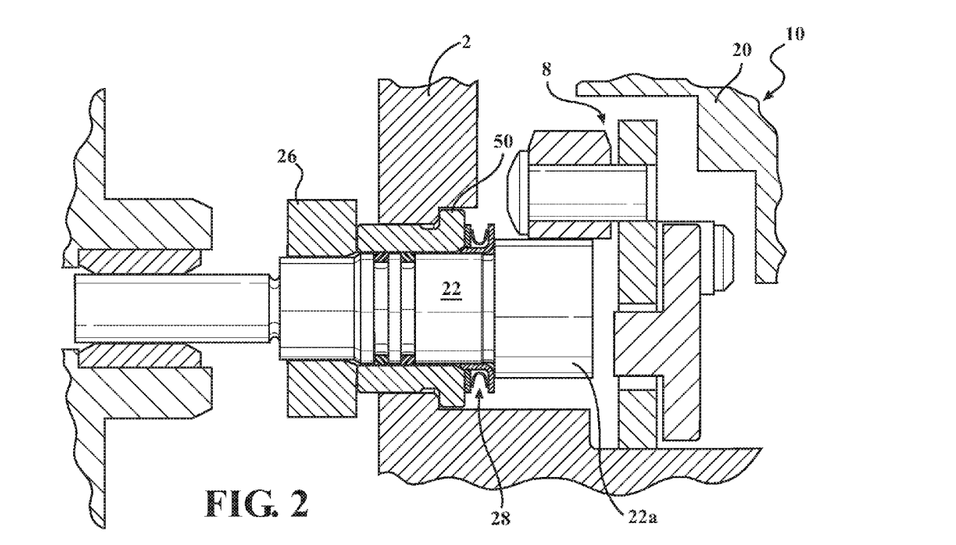
FIG. 2 is a cross sectional view of an enlarged portion of a VTG turbocharger showing the face seal assembly of FIG. 1 disposed on the actuation pivot shaft.
Figure 3:
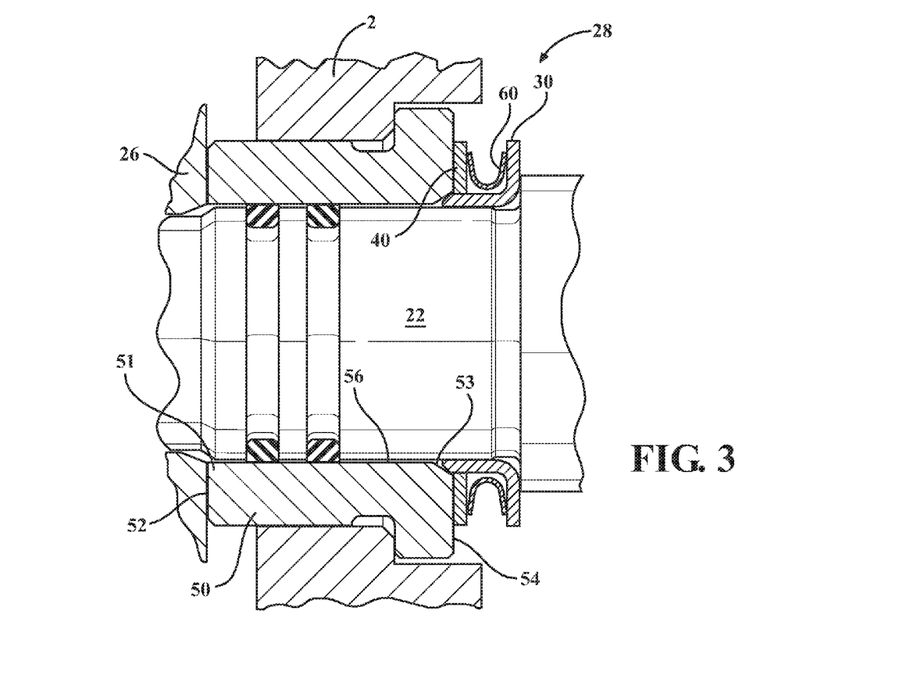
FIG. 3 is a cross sectional view of a portion of the actuation pivot shaft showing the face seal assembly of FIG. 1.
Figure 4:
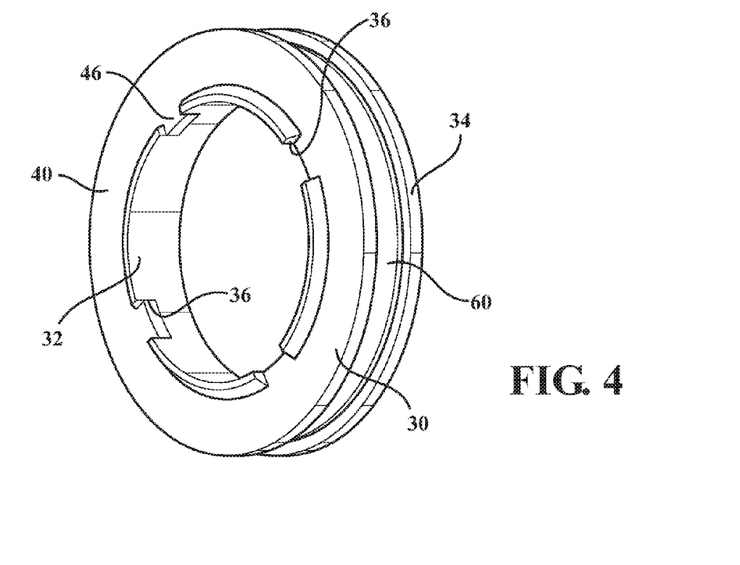
FIG. 4 is a perspective view of the face seal assembly of FIG. 1.
Figure 5:
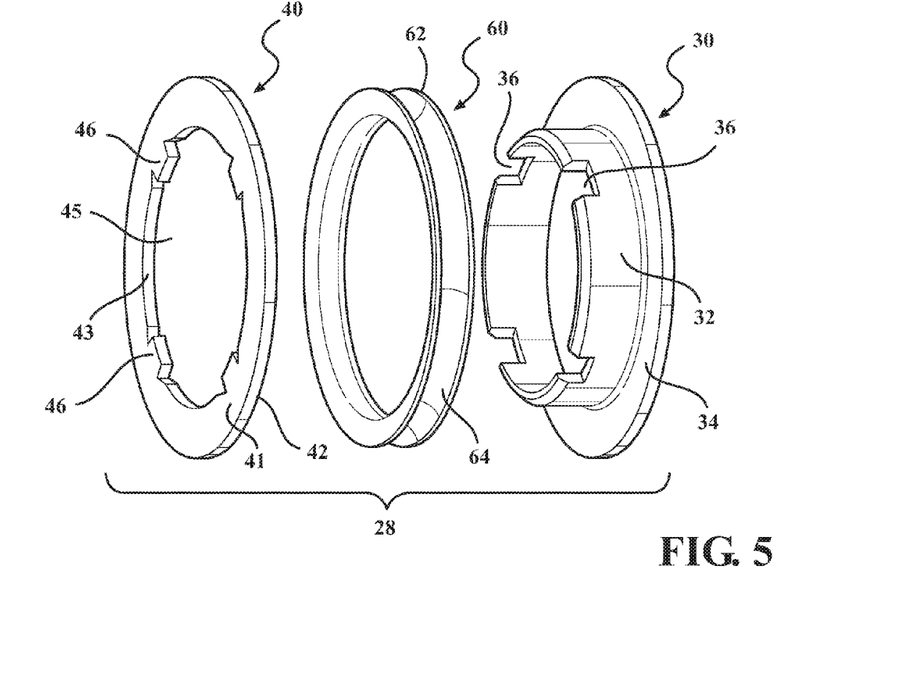
FIG. 5 is an exploded view of the face seal assembly of FIG. 1.
Figure 6:
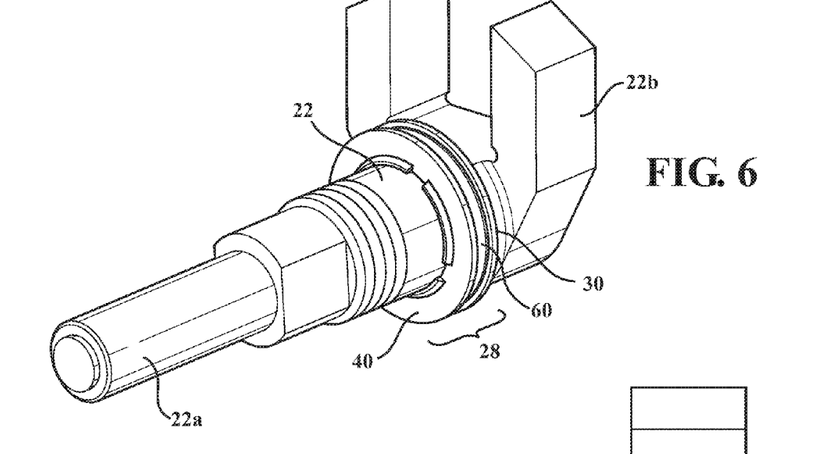
FIG. 6 is a perspective view of the face seal assembly of FIG. 1 disposed on the actuation pivot shaft.
Figure 7:
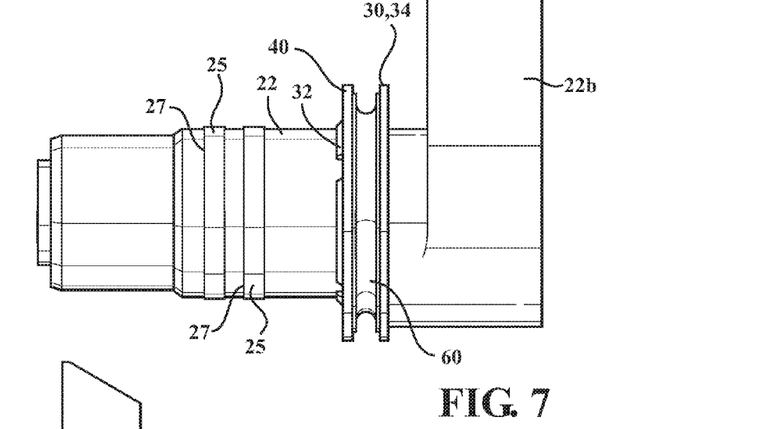
FIG. 7 is a side view of the face seal assembly of FIG. 1 disposed on the actuation pivot shaft.
Figure 8:
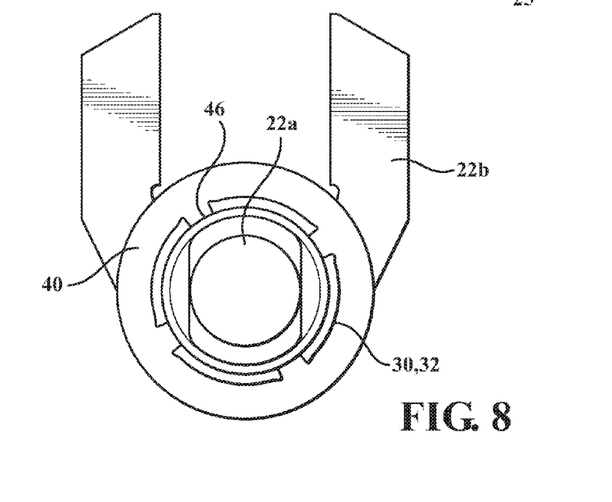
FIG. 8 is an end view of the face seal assembly of FIG. 1 disposed on the actuation pivot shaft.

The U-seal ring 60 (e.g., spring or seal member or ring) is annular and includes a radially outer peripheral edge 62 having a circumferential groove 64 (e.g., channel). As a result, the U-seal ring 60 has a U-shaped cross section that opens radially outward. The U-seal ring 60 is disposed between the second side face 42 of the disc 40 and the bushing-facing surface of the inner ring arm 34 and is configured to function as a spring that biases the disc 40 away from the arm 34 of the inner ring 30 such that a sealed contact is formed between the U-Seal ring 60 and the inner surfaces of both the arm 34 of the inner ring 30 and the second side face 42 of the disc 40. The U-seal ring 60 is compressed in an axial direction with opposing walls of the U-seal ring 60 being sealingly engaged and biased toward each other by the second side face 42 of the disc 40 and the arm 34 of the inner ring 30. At the same time, the U-seal ring 60 is configured to allow the disc 40 to resiliently deflect or collapse axially inward toward the inner ring 30 (i.e., the opposing walls of the U-seal ring 60 deflect axially toward each other). This axial deflection accommodates axial movement of the pivot shaft 22 relative to the bushing 50 and also accommodates tilting of the actuation pivot shaft 22 relative to the bushing 50 (i.e., with unequal axial movement of the pivot shaft 22 at different circumferential locations). Moreover, pressure on the U-seal ring 60 from exhaust gas within the housing 2 pressurizes the circumferential groove 64, such that the opposing walls of the U-seal ring 60 apply seating force against the second side face 42 of the disc 40 and the arm 34 of the inner ring 30, which supplements the sealing force that is due to resiliency of the U-seal ring 60 itself. According to other embodiments, the seal ring 60 may not be self-energized by the pressure within the housing 2, for example, by instead having a cross-sectional profile that does not open toward a high pressure region (e.g., a U-seal opening the opposite direction or seal rings that extend radially outward but not back inward).

The U-seal ring 60 is preferably formed of metal, but is not limited to this material. "U-seal" may define the outer shape of the metallic ring, but may include other styles, such as C or E (with an added inner shelf for added reinforcement or stability), M or W.

The U-seal ring 60 adds compliance to the seal system to permit misalignment while maintaining the face seal. The metal U-seal ring 60 applies a seating force against the disc 40. As described above, the circumferential groove 64 of the U-seal ring 60 forms a concave channel that opens radially outward to a high pressure region, such that turbine pressure exterior to (i.e., radially outward of) the face seal assembly 28 acts to energize the U-seal ring 60 (i.e., pressurizes the channel to force opposing walls of the U-seal ring 60 axially away from each other), so as to apply the seating force against the disc 40 and the inner ring 30. For this reason, the face seal assembly 28 is referred to as a face seal with an external pressure seal. Because the disc 40 and inner ring 30 rotate together with the U-seal ring 60 therebetween, the wear between the U-seal ring 60 and those components is greatly reduced, as compared to if the U-seal ring 60 were to instead rotate and slide against another member (e.g., the bushing 50). Still further, the U-seal ring 60, by engaging and being positioned between the inner ring 30 and the disc 40, may not slide against any surface of any other member of the turbocharger. Rather, the primary wear interface is between the bushing 50 and disc 40.

Referring to FIGS. 9-15, an alternative embodiment face seal assembly 128 may be used in the turbocharger 10. The face seal assembly 128 is disposed between an opening 51 formed in an outside axial end face 52 of the bushing 50, and the actuation pivot shaft 22 that extends through the opening 51. The face seal assembly 128 is disposed on the outside axial end face 52 of the bushing 50 such that the face seal assembly 128 resides outside the bearing and turbine housings 2, 20 in region of atmospheric pressure than inside the turbine housing 20 and bushing 50 and relatively lower temperature than inside the turbine housing 20.

Figure 9:
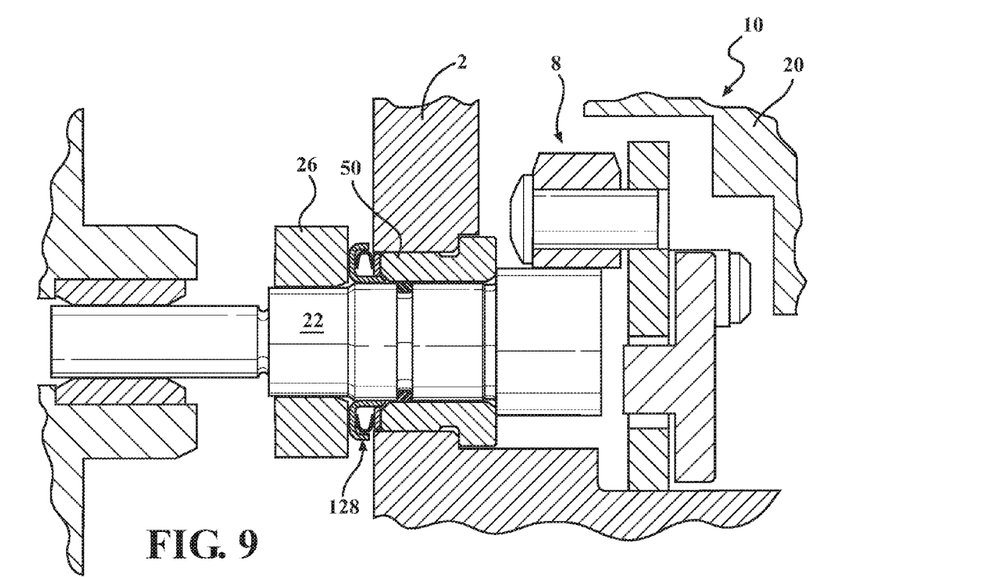
FIG. 9 is a cross sectional view of an enlarged portion of a VTG turbocharger showing an alternative face seal assembly with an internal pressure U-seal disposed on an actuation pivot shaft.
Figure 10:
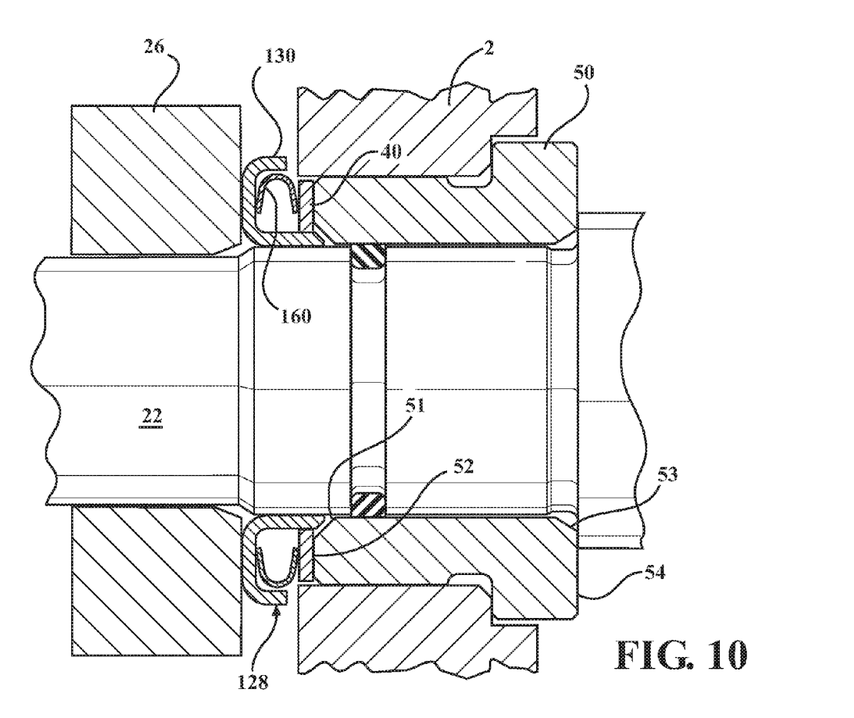
FIG. 10 is a cross sectional view of a portion of the actuation pivot shaft showing the face seal assembly of FIG. 9.
Figure 11:
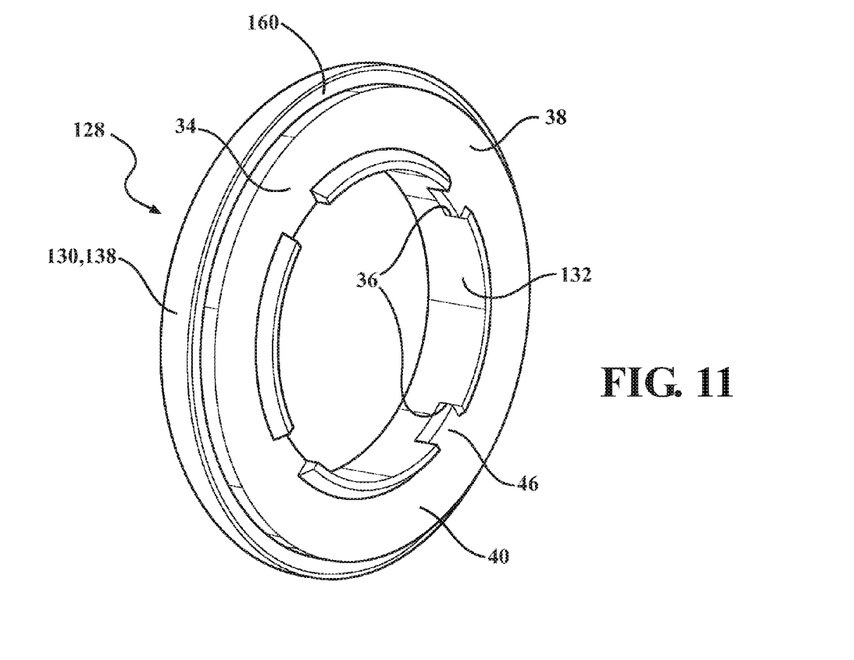
FIG. 11 is a perspective view of the face seal assembly of FIG. 9.
Figure 12:
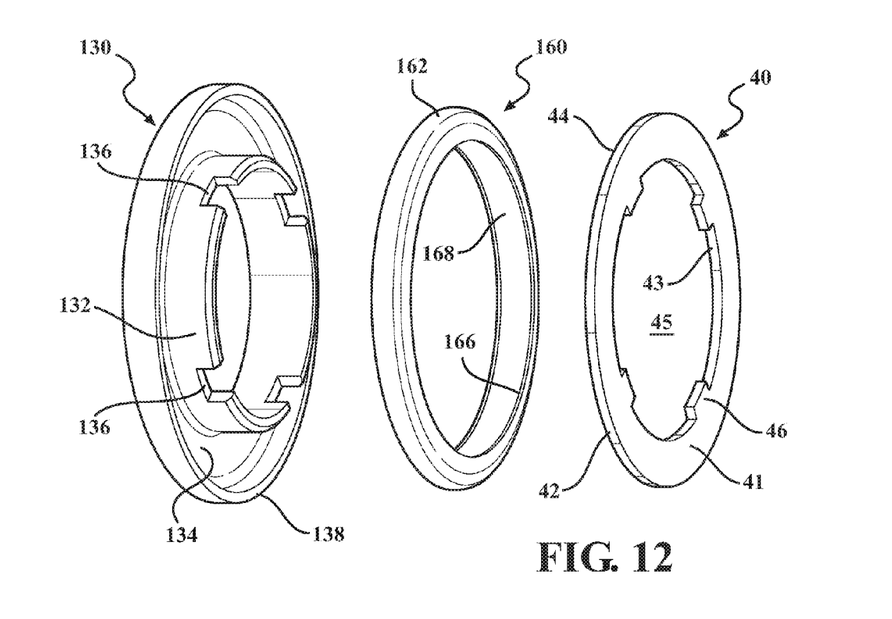
FIG. 12 is an exploded view of the face seal assembly of FIG. 9.
Figures 13, 14, 15:
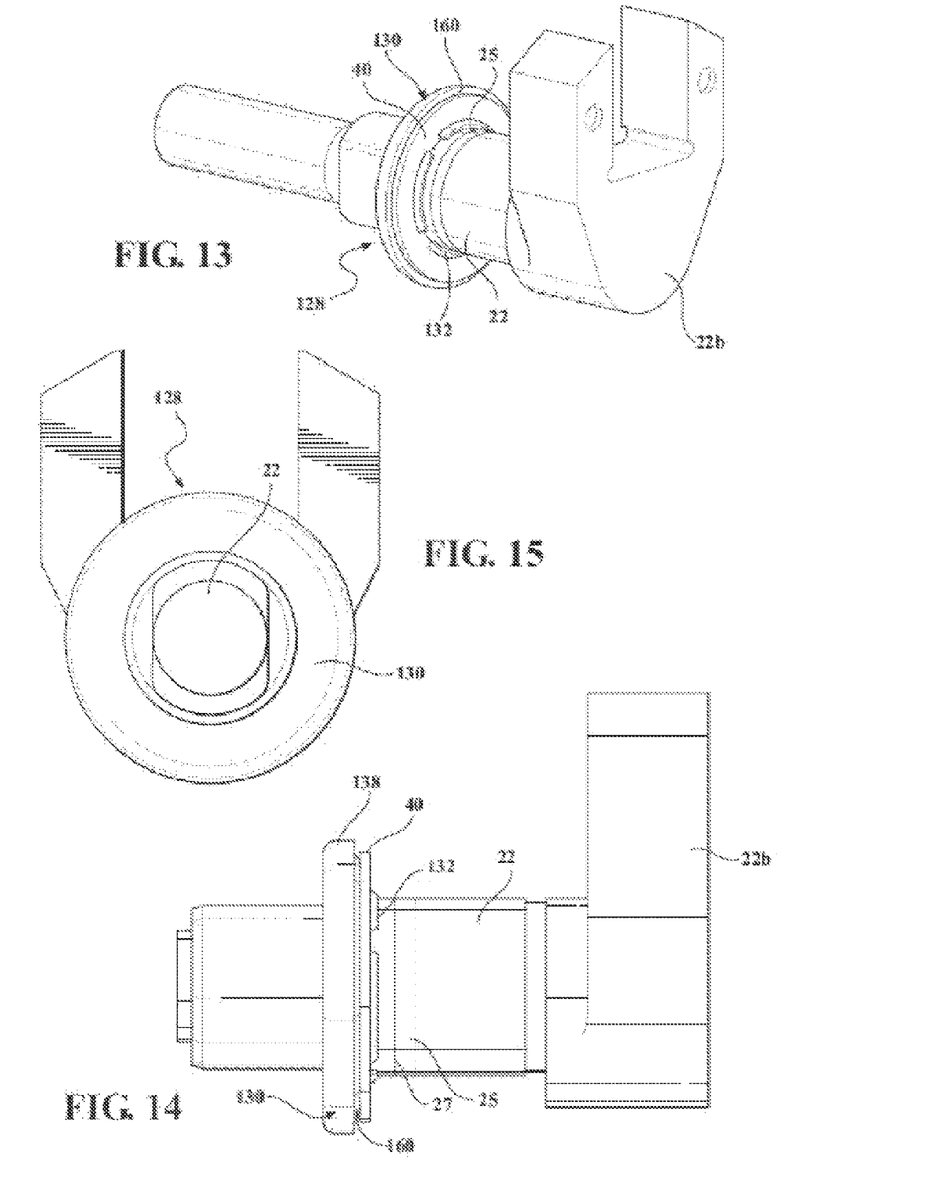
FIG. 13 is a perspective view of the face seal assembly of FIG. 9 disposed on the actuation pivot shaft.
FIG. 14 is a side view of the face seal assembly of FIG. 9 disposed on the actuation pivot shaft.
FIG. 15 is an end view of the face seal assembly of FIG. 9 disposed on the actuation pivot shaft.

The face seal assembly 128 includes a U-seal ring 160 that forms a seal between a disc 40 and an inner ring 130. The inner ring 130 is annular and includes a hollow cylindrical base portion 132 configured to receive the actuation pivot shaft 22 in a press fit connection such that the inner ring 130 is rotationally fixed to the actuation pivot shaft 22 and forms a seal on the actuation pivot shaft 22. In addition, the inner ring 130 includes a radially outward-extending arm 134 (e.g., radially extending flange) formed at one end of the base portion 132, and a flange 138 (e.g., circumferential or axially extending flange) formed at the radially outward end of the arm 134. The flange 138 extends parallel to the base portion 132 and toward the bushing 50. The flange 138 serves to radially position the U-seal ring 160 relative to the disk 40, and also serves as a bump stop (e.g., by engaging the housing 2 or other member) to prevent over-compression of the face seal assembly 128 in an axial direction, for example due to tilting of the actuation pivot shaft 22 relative to the bushing 50.

Thus, the inner ring 130 has a generally U-shaped cross section that opens facing the bushing 50 (i.e., in an axial direction). The inner ring is 130 is disposed on the actuation pivot shaft 22 with the free end of the base portion 32 disposed at the opening 51, and the arm 34 axially spaced from the outside axial end face 52 of the bushing 50. The base portion 132 includes axially-extending slots 136 that open to the free end of the base portion 132.

The disc 40 is substantially similar to the disc described above with respect to FIGS. 2-8, and is rotationally fixed to the inner ring 130 in any of the manners described previously. For this reason, common reference numbers are used to refer to common parts, and the description is not repeated herein.

The U-seal ring 160 is annular and includes a radially outer peripheral edge 162 and an inner peripheral edge 166 having a circumferential groove 168 (e.g., channel). As a result, the U-seal ring 160 has a U-shaped cross section that opens radially inwardly. The U-seal ring 160 is disposed in a space defined between the second side face 42 of the disc 40, the bushing-facing surface of inner ring arm 134, and the shaft-facing inner surface of the flange 138. The U-ring seal 160 is configured to function as a spring that biases the second side face 42 of the disc 40 away from the arm 134 of the inner ring 130. Stated differently, the U-seal ring 160 is compressed in an axial direction with opposing walls of the U-seal ring 160 being engaged and biased toward each other by the second side face 42 of the disc 40 and the arm 134 of the inner ring 130. The U-seal ring 160 thereby forms a seal between the inner ring 130 and the disc 40, which is maintained with axial displacement or misalignment of the pivot shaft 22 relative to the bushing 50, as described previously for the face seal assembly 28. Moreover, pressure on the U-seal ring 160 from exhaust gas exiting the housing 2 via the bore 16 of the housing 2 and a bore 56 of the bushing 50 applies seating force against the disc 40 by pressurizing the circumferential groove 168 in the manner described above for the U-seal ring 60. According to other embodiments, the seal ring 160 may not be self-energized, for example, by having a cross-sectional profile that does not open toward a high pressure region (e.g., a U-seal opening the opposite direction or seal rings that extend radially outward but not back inward).

The U-seal ring 160 is preferably formed of metal, but is not limited to this material. "U-seal" may define the outer shape of the metallic ring, but may include other styles, such as C or E (with an added inner shelf for added reinforcement or stability), M or W.

The U-seal ring 160 adds compliance to the seal system to permit misalignment while maintaining the face seal. The metal U-seal ring 160 applies a seating force against the disc 40. The circumferential groove 164 of the U-seal ring 160 forms a concave channel that opens radially inward to a high pressure region within the bushing bore 56, such that turbine pressure interior to (i.e., radially inward of) the face seal assembly 128 acts to energize the U-seal ring 160 (i.e., pressurizes the channel to force opposing walls of the U-seal ring 160 axially away from each other), so as to apply the seating force against the disc 40 and the inner ring 130. For this reason, the face seal assembly 128 is referred to as a face seal with an internal pressure seal. Because the disc 40 and inner ring 130 rotate together, with the U-seal ring 160 therebetween, the wear between the U-seal ring 160 and those components is greatly reduced, as compared to if the U-seal ring 160 were to instead rotate and slide against another member (e.g., the bushing 50 or housing 2). The primary wear interface is between the bushing 50 and disc 40.

The internal-pressure face seal assembly 128 may have improved support on actuation pivot shaft 22 by retaining critical outboard bushing contact area. But, less area on the disc 40 for pressure to act upon reduces the energizing effect of pressure on the face seal. The internal-pressure face seal assembly 128, since it is farther from the turbine housing 20, may also be preferred if lower seal temperature is important.

The face seal assembly 28, 128 depending on its location with respect to the bushing 50, can be energized either by the external pressure U-seal ring 60 or an internal pressure U-seal ring 160. When on the turbine-side of the bushing 50 as illustrated above with respect to FIGS. 2-8, the U-seal ring 60 may be energized by external pressure (i.e., a high pressure region radially outward of the U-seal ring 60) from turbine gas outside the actuation pivot shaft 22. When on the opposed side of the bushing 50, so as to be adjacent to the VTG lever 26 and on an atmospheric pressure side of the housing 2, 20 as illustrated above with respect to FIGS. 9-15, the face seal assembly 128 is still at the axial end face 52 of the bushing 50, but the U-seal ring 160 is energized from the internal pressure direction (e.g., from a high pressure region radially inward of the U-seal ring 160 that is within the bushing bore 56) with higher pressure around the actuation pivot shaft 22 than atmospheric pressure.

Figure 16:
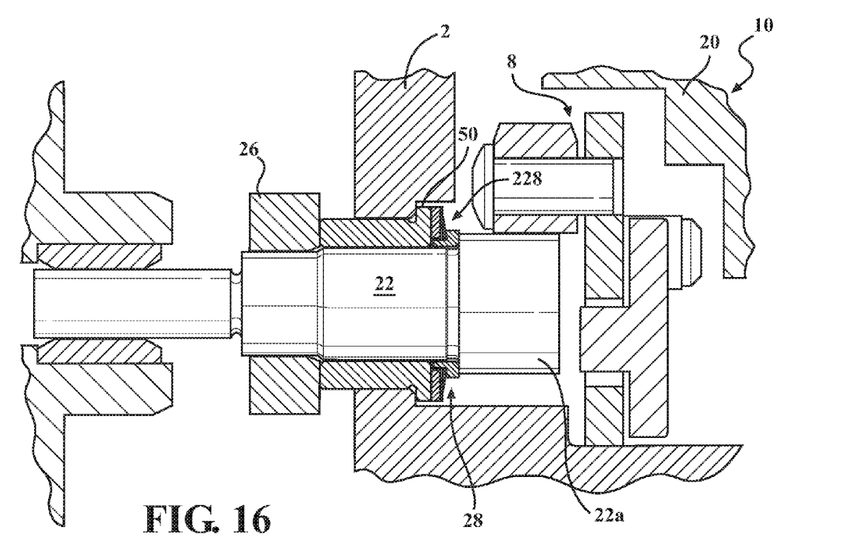
FIG. 16 is a cross sectional view of an enlarged portion of a VTG turbocharger showing a face seal assembly according to another exemplary embodiment disposed on the actuation pivot shaft.
Figure 17:
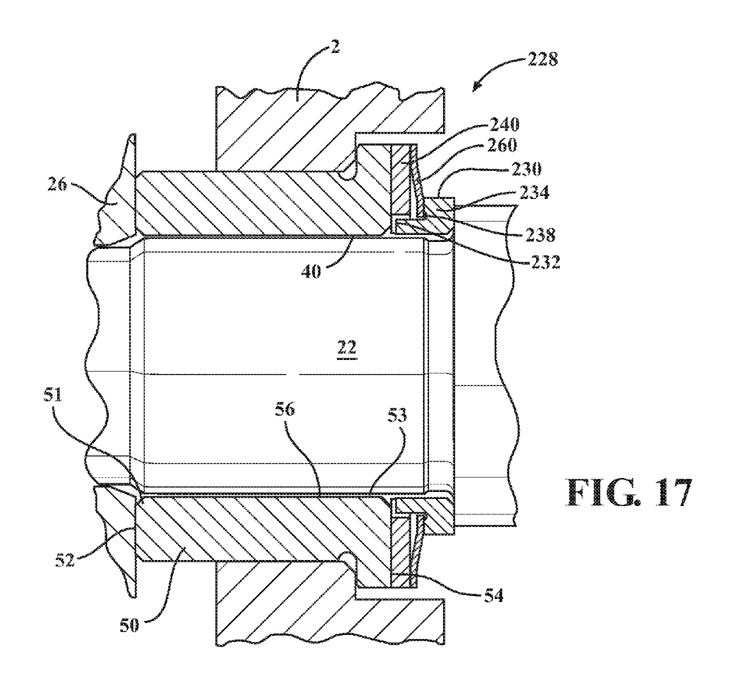
FIG. 17 is a cross sectional view of a portion of the actuation pivot shaft showing the face seal assembly of FIG. 16.

Referring to FIGS. 16-19, an alternative face seal assembly 228 may be used in the turbocharger 10. As shown in FIGS. 16-17, the face seal assembly 228 may be disposed within the housing 2 (e.g., between the opening 53 formed in the inside axial end face 54 of the bushing 50 and the actuation pivot shaft 22) as is the face seal assembly 28. Alternatively, the face seal assembly 228 may be disposed outside the housing 2 (e.g., between the opening 51 formed in the outside axial end face 52 of the bushing 50, and the actuation pivot shaft 22) as is the face seal assembly 128.

The face seal assembly 228 includes an inner ring 230, a disc 240, and a seal ring 260 that form a seal between the inner ring 230 and the disc 240. As with the seal rings 60, 160 of the seal assemblies 28, 128, the seal ring 260 similarly engages axially facing surfaces of the inner ring 230 and the disc 240 to form a resilient, compliant seal therebetween. The seal ring 260 has a three-dimensional cross-sectional shape that extends only radially outward, as discussed in further detail below, rather than having a U-shaped cross-sectional shape similar to the seal rings 60, 160 (i.e., that extends radially outward and back radially inward).

The inner ring 230 is annular and includes a hollow cylindrical base portion 232 configured to receive the actuation pivot shaft 22 in a press fit connection, such that the inner ring 230 is rotationally fixed to the actuation pivot shaft 22 and forms a seal on or with the actuation pivot shaft 22. The inner ring 230 also includes a radially outward-extending flange or arm 234 extending radially outward from an axial end of the base portion 232, so as to have a substantially L-shaped cross-section. A circumferential channel 238 is positioned radially between the base portion 232 and the arm 234. The inner ring 230 is disposed on the actuation pivot shaft 22 with a second or free end of the base portion 232 being disposed at the opening 53, and the arm 234 being axially spaced from the axial end face 54 of the bushing 50. The base portion 232 includes axially extending slots 236 that open to the second end of the base portion 232.

Figure 18:
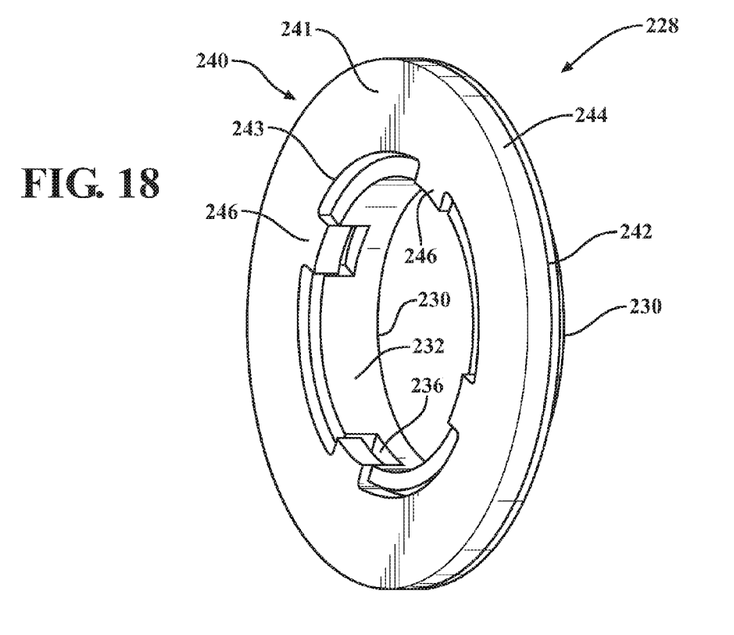
FIG. 18 is a perspective view of the face seal assembly of FIG. 16.
Figure 19:
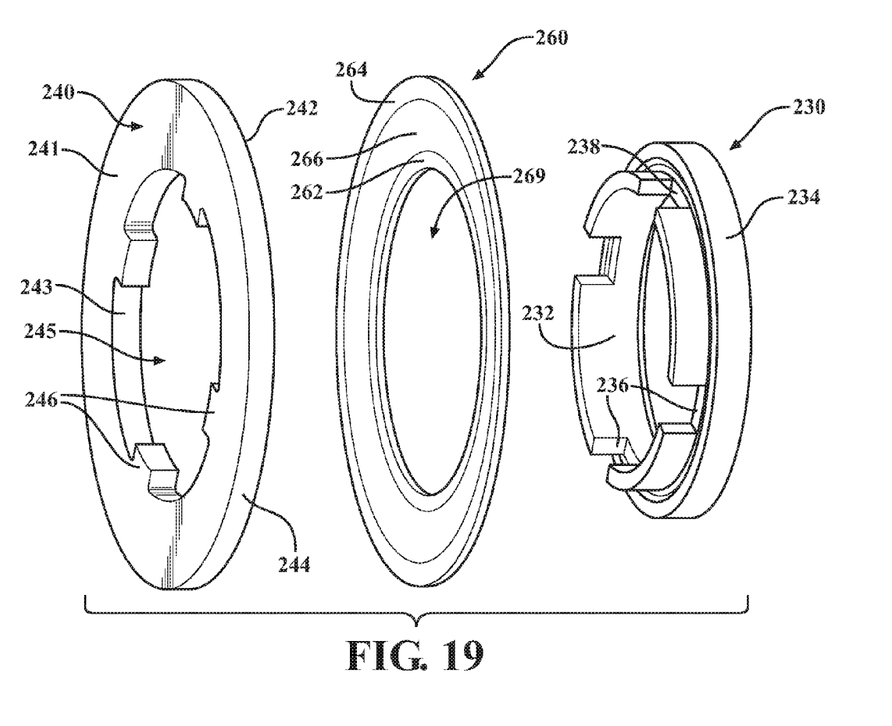
FIG. 19 is an exploded view of the face seal assembly of FIG. 16.

The disc 240 is configured substantially similar to the disc 40 and includes an outer peripheral edge 244, an inner peripheral edge 243 that defines a central opening 245, and opposed planar side faces 241, 242 that extend between the outer peripheral edge 244 and the inner peripheral edge 243 in a radial direction. As with disc 40, the disc 240 further includes tabs 246 (e.g., four, or otherwise complementary in number to the slots 236 of the inner ring 230) that are spaced circumferentially and protrude radially-inward from the inner peripheral edge 243. The base portion 232 of the inner ring is received within the central opening 245, and the tabs 246 are configured to be received in the slots 236 of the base portion 232 of the inner ring 230. This interface between the tabs 246 and the slots 236 prevents the disc 240 rotating relative to the inner ring 230 (e.g., the disc 240 is "keyed" or rotationally fixed or locked to the inner ring 230). This interface also allows relative axial displacement between the disc 240 and the inner ring 230, including tilt as a result of uneven relative axial displacement. The inner peripheral edge 243 may have a constant radius between the tabs 246 so as to receive the cylindrical portion 232 of the inner ring 230 therein. Alternatively, the inner peripheral edge 243 may increase in radius adjacent the tabs 246 (e.g., as shown with inner peripheral edge 43 and the tabs 46 of the disc 40), which allows edges of the tabs 246 to extend radially outward to or past the otherwise constant radius, while still allowing for a curved transition (e.g., fillets) between the tabs 246 and inner peripheral edge 243 without interfering with the outer cylindrical portion 232 of the inner ring 230 received therein. According to other embodiments, the disc 240 may be rotationally fixed to the inner ring 230 in another manner, including those described above for the disc 40 and inner ring 30.

The seal ring 260 forms a spring seal, which is disposed in a space defined axially between the disc 240 and inner ring 230. The seal ring 260 functions as a spring that bears against and biases the inner ring 230 (i.e., the radial flange 234) and the disc 240 (i.e., the second surface 242) away from each other. Because the inner ring 230 and disc 240 are rotationally locked, the seal ring 260 positioned therebetween does not rotate relative thereto or slide thereagainst, thereby limiting or preventing wear of the seal ring 260.

The seal ring 260 is annular and in cross-section includes an inner segment 262 (e.g., radially inner portion), an outer segment 264 (e.g., radially outer portion), and an intermediate segment 266 (e.g., intermediate portion) extending continuously between the inner segment 262 and the outer segment 264. In a nominal (i.e., undeflected state), the inner segment 262 and the outer segment 264 are positioned at different axial and radial positions, while the intermediate segment 266 extends therebetween at a non-normal angle relative to a central axis of the seal ring 260, thereby allowing axial deflection of the first segment 262 and the second segment 264 toward each other. The seal ring 260 does not include a channel that opens radially inward or outward, so as to not be self-energized, and extends radially outward but not back radially inward, unlike the U-seal rings 60, 160. According to alternative embodiments, the U-seal ring 228 may, however, be self-energized and/or have another cross-sectional profile as mentioned above, while still engaging the inner ring 230 and the disc 240 at different radial locations.

The inner segment 262 includes an inner periphery that defines a central aperture 269, which receives the base portion 232 of the inner ring 230 therein. The inner segment 262 engages and presses axially against the arm 234 of the inner ring 230 to form a continuous seal therewith at a radially inward location. The inner segment 262 may, for example, engage the radial flange 234 at a location adjacent the circumferential channel 238. The circumferential channel 238 allows the arm 234 to have a straight surface that the inner segment 262 engages, while still allowing for a curved transition (e.g., fillets) between the arm 234 and the cylindrical base portion 232 that does not interfere with the inner segment 262 of the spring seal 260. The inner segment 262 nominally (i.e., when uncompressed) extends straight radially at a perpendicular angle relative to an axis of the seal ring 260, but may have a different profile (e.g., curved) and/or extend at a different angle.

The outer segment 264 forms the outer periphery of the seal ring 260. The outer segment 264 engages and presses axially against the second side surface 242 of the disc 240 at a radially outward location to form a continuous seal therewith. The outer segment 264 nominally extends straight radially at a perpendicular angle relative to an axis of the seal ring 260, but may have a different profile (e.g., curved) and/or extend at a different angle. Alternatively, the seal ring 260 may be oriented in an opposite manner, wherein the outer segment 264 engages the inner ring 230, and the inner segment 262 engages the disc 240.

With the inner segment 262 being positioned radially inward of and axially apart from the outer segment 264, the intermediate segment 266 forms a web extending radially outward from the inner segment 262 to the outer segment 264 at a non-normal angle relative to the axis of the seal ring 260. When the seal ring 262 is compressed axially, the inner segment 262 and the outer segment 264 are moved axially closer to each other with the intermediate segment 266, in conjunction with the inner segment 262 and outer segment 264, providing resilient axial compliance to the seal assembly 228. The inner segment 262 and the outer segment 264 remain sealingly engaged with the inner ring 230 and the disc 240, respectively, as they are moved axially relative to each other. The seal ring 262 also biases the disc 240 (i.e., provides a seating force) against the bushing 50 to maintain a face seal therewith, even as the shaft 22 and, thereby, the entire seal assembly 228 is rotated and/or the shaft 22 is moved axially. The seal assembly 228 thereby provides axial displacement and tilt compliance between the shaft 22 and the bushing 50, while maintaining a seal therebetween.

Although described herein for use in providing a seal between a rotating shaft and an opening formed in an axial end face of a bushing, where the bushing is disposed in an opening in a turbocharger housing, the face seal assembly 28, 128, 228 is not limited to this configuration. For example, the face seal assembly 28, 128, 228 can be used generally to provide a seal between an opening formed in a housing surface and a rotating shaft that extends out of the opening.

The actuation pivot shaft 22 may optionally include an additional seal 24 disposed between an outer surface of the actuation pivot shaft 22 and an inner surface of the bushing 50. For example, the seal may include one or more piston rings 25 disposed in grooves 27 formed in the outer surface of the actuation pivot shaft 22 (see, e.g., FIGS. 2-3), or may not include any such seal (see, e.g., FIGS. 16-17).

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A face seal assembly comprising:
 a first annulus comprising a cylindrical body have a central bore configured to be press fit onto a pivot shaft to be fixed to and form a first seal with the pivot shaft, the first annulus additionally comprising a flange extending radially outward from the cylindrical body and a first rotational locking feature;
 a second annulus having a central aperture configured to receive the cylindrical body of the first annulus therein, the second annulus additionally comprising a first planar side surface that is configured to form a face seal, a second planar side surface opposite the first planar side surface, and a second rotational locking feature configured to engage the first rotational locking feature to rotationally lock the first annulus to the second annulus while allowing the second annulus to tilt and displace axially relative to the first annulus; and
 a spring seal including a first axially facing surface that engages the flange to form a second seal therewith and including a second axially facing surface that engages the second planar side surface to form a third seal therewith and to apply a seating force against the second annulus.

2. An actuation system for a variable turbine geometry turbocharger, the actuation system comprising:
 an actuator;
 a pivot shaft coupled to the actuator to be rotated thereby back and forth within a limited range of rotational movement; and
 a face seal assembly, the face seal assembly comprising:
  a first annulus rotationally fixed to the pivot shaft and forming a first seal therewith;
  a second annulus rotationally fixed to the first annulus and axially movable relative thereto, wherein the second annulus is configured to form a face seal with another member of the turbocharger; and
  a spring seal compressible axially between the first annulus and the second annulus to therebetween form a second seal that is maintained as the pivot shaft is moved to cause axial misalignment and axial displacement between the first annulus and the second annulus.

3. The actuation system of claim 2 further comprising a bushing configured to be received within an opening of a housing of the turbocharger, wherein the bushing includes a central bore through which the pivot shaft extends, and a tolerance between the bore and the pivot shaft allows the pivot shaft to rotate therein and tilt relative thereto to cause the axial misalignment.

4. The actuation system of claim 3, wherein the second annulus forms the face seal with an end surface of the bushing.

5. The actuation system of claim 2, wherein the first annulus and the second annulus include rotational locking features that rotationally fix the second annulus to the first annulus.

6. The actuation system of claim 5, wherein the rotational locking features include a tab received within a slot.

7. The actuation system of claim 2, wherein the second annulus includes a first side surface that is planar and forms the face seal and a second side surface that is opposite the first side surface, and the spring seal includes a first axially facing surface that forms a first portion of the second seal with the second side surface and applies a seating force thereagainst.

8. The actuation system of claim 7, wherein the spring seal includes a second axially facing surface that forms a second portion of the second seal with a radially extending arm of the first annulus.

9. The actuation system of claim 8, wherein the spring seal includes a central aperture having an axis, an inner segment extending radially outward from the central aperture, an intermediate segment extending radially outward from the inner segment and a non-perpendicular angle relative to the axis, and an outer segment extending radially outward from the intermediate segment; and
 wherein the inner segment includes one of the first or the second axially facing surface, and the outer segment includes the other of the first or the second axially facing surface.

10. The actuation system of claim 8, wherein the spring seal is a U-seal ring.

11. The actuation system of claim 2, wherein the first annulus and the second annulus are positioned on opposing sides of the spring seal, the first annulus and the second annulus being configured and dimensioned to insulate the spring seal from frictional wear as the pivot shaft is rotated.

12. A Variable Turbine Geometry (VTG) turbine turbocharger, comprising:
 a turbine wheel and a housing, the turbine wheel being disposed in the housing;
 a compressor wheel and a main shaft that connects the turbine wheel and the compressor wheel;
 a VTG assembly disposed in the housing, an actuator disposed outside the housing, and an actuation pivot shaft that extends through an opening of the housing and connects the VTG assembly to the actuator; and
 a face seal assembly that seals the opening, the face seal assembly comprising:
  an inner ring rotationally fixed on the actuation pivot shaft;
  a disc including a first side face that forms a first seal with a surface of the housing, the disc being rotationally fixed to the inner ring and being movable axially relative to the inner ring; and
  a spring seal ring forming a second seal between the inner ring and the disc and applying a seating force against the disc.

13. The turbocharger of claim 12, wherein:
 the inner ring is annular and includes a hollow cylindrical base portion coupled to the actuation pivot shaft to form a third seal therewith, and a radially-extending flange formed at one end of the base portion;

the disc includes an inner edge that defines a central opening and includes a second side face that is opposed to the first side face, the base portion of the inner ring being received within the central opening; and the spring seal ring is disposed between the second side face of the disc and the flange and is configured to function as a spring that biases the second side face of the disc away from the flange of the inner ring.

14. The turbocharger of claim 13, wherein the base portion of the inner ring includes an axially extending slot, and the disc includes a tab protruding radially inward into the central opening, the tab being received within the slot to rotationally fix the disc to the inner ring.

15. The turbocharger of claim 12, wherein the inner ring and the disc include complementary engaging features that rotationally fix the inner ring and the disc to each other.

16. The turbocharger of claim 15, wherein the spring seal is compressible in an axial direction between the inner ring and the disc, such that the face seal assembly seals the opening as the actuation pivot shaft is at least one of tilted or moved axially relative to the opening.

17. The turbocharger of claim 12, wherein the inner ring and the disc are positioned on opposing sides of the spring seal ring, the inner ring and the disc being configured and dimensioned to insulate the spring seal ring from frictional wear.

18. The turbocharger of claim 12, wherein the spring seal includes a central aperture having an axis, an inner segment that extends radially outward from the central aperture, an intermediate segment that extends radially outward from the inner segment at a non-perpendicular angle relative to the axis, and an outer segment that extends radially outward from the intermediate segment.

19. The turbocharger of claim 18, wherein to form the second seal, the inner segment includes a first axially facing surface that engages one of the flange of the inner ring or the second side surface of the disc to seal therewith, and the outer segment includes a second axially facing surface that engages the other of the flange of the inner ring or the second side surface of the disc to seal therewith.

20. The turbocharger of claim 12, wherein the housing includes a bushing that forms the surface of the housing, and the first side face of the disc forms the first seal with the bushing.

* * * * *